US006734418B2

United States Patent
Hashimoto (10) Patent No.: US 6,734,418 B2
(45) Date of Patent: May 11, 2004

(54) ROTATIONAL DIRECTION DETECTING APPARATUS

(75) Inventor: Chiaki Hashimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/254,781

(22) Filed: Sep. 26, 2002

(65) Prior Publication Data

US 2003/0057364 A1 Mar. 27, 2003

(30) Foreign Application Priority Data

Sep. 27, 2001 (JP) ..................... P2001-295417

(51) Int. Cl.⁷ ............... G01D 5/34; G01B 11/14
(52) U.S. Cl. ................. 250/231.14; 356/617
(58) Field of Search ................. 250/230, 232, 250/233, 231.13, 231.14, 231.16, 231.17, 231.18; 356/616, 617; 341/31, 35

(56) References Cited

U.S. PATENT DOCUMENTS 4,988,865 A * 1/1991 Schmidt

FOREIGN PATENT DOCUMENTS

JP          4-50771         2/1992

* cited by examiner

Primary Examiner—David Porta
Assistant Examiner—David C. Meyer
(74) Attorney, Agent, or Firm—Morgan, Lewis & Bockius LLP (57) ABSTRACT

A control part 7 detects pulse widths of four continuous pulses, and a pulse width w1 of a pulse detected first is compared in size with a pulse width w2 of a pulse detected second and when w2 is larger, normality is determined. The pulse width w2 of the pulse detected second is compared in size with a pulse width w3 of a pulse detected third and when w3 is larger, normality is determined. The pulse width w3 of the pulse detected third is compared in size with the pulse width w1 of the pulse detected first and when w1 is larger, normality is determined. In the above first to fourth determinations, when the number of cases determined as normality is two times or more, normal rotation is determined, and otherwise, reverse rotation is determined.

9 Claims, 9 Drawing Sheets

ROTATIONAL DIRECTION DETECTING APPARATUS

BACKGROUND OF THE INVENTION

1. Field of the Invention

This invention relates to a rotational direction detecting apparatus for detecting a rotational direction of a rotated member rotated by a motor, and further to a rotational direction detecting apparatus capable of detecting a rotational speed of the rotated member.

2. Description of the Related Art

Conventionally, a mechanism part (hereinafter called "a rotating mechanism part") for rotating a rotated member by a motor has been applied to various apparatus. For example, a CD player or a DVD apparatus provides a rotating mechanism part for rotating a turntable (equivalent to the rotated member) on which a CD or a DVD (a disk medium) is placed, and the disk medium is rotated by rotating this turntable.

Also, the apparatus providing the rotating mechanism part is provided with a mechanism part (a rotational direction detecting apparatus described by the invention) for detecting a rotational direction or a rotational speed of the rotated member.

For example, there was a rotational direction detecting apparatus disclosed in JP-A-4-50771. In this rotational direction detecting apparatus, a disk in which slits with different sizes respectively are formed in four places on concentric circles is mounted in a rotating shaft of a motor. The rotated member is mounted in the rotating shaft of this motor. The slits are in a position in which one of the edges is divided into four equal portions radially with respect to the center of the disk. Also, ratios of the lengths of the four slits are 1:2:3:4 on the concentric circles and the four slits are formed clockwise in this order. Also, a photo interrupter for applying light from one side with the disk sandwiched and detecting the light passing through the slits in the other side is provided.

In this rotational direction detecting apparatus, a pulse width detected by the photo interrupter becomes long gradually in the case of rotating at constant speed clockwise and the pulse width detected by the photo interrupter becomes short gradually in the case of rotating at constant speed counterclockwise in reverse, so that a rotational direction is determined by detecting a change in this pulse width.

Also, a rotational speed is calculated from time taken from fall timing of an arbitrary pulse detected by the photo interrupter to fall timing of the next pulse in the case of rotating at constant speed clockwise, and is calculated from time taken from rise timing of an arbitrary pulse detected by the photo interrupter to rise timing of the next pulse in the case of rotating at constant speed counterclockwise.

However, the rotational direction detecting apparatus cannot determine the rotational direction unless it respectively detects the pulse widths of the light passing through the four slits by the photo interrupter. Also, unless the rotational direction is determined, the rotational speed cannot be calculated. Here, there was a problem that time taken to rotate the disk once is necessary to respectively detect the pulse widths of the light passing through the four slits by the photo interrupter and time taken to detect the rotational direction is long.

SUMMARY OF THE INVENTION

An object of the invention is to provide a rotational direction detecting apparatus for reducing time necessary to detect a rotational direction of-a rotated member.

Another object of the invention is to provide a rotational direction detecting apparatus for achieving cost cutting of a main body by simplifying processing performed in detection of a rotational direction of a rotated member.

In order to solve the problems, a rotational direction detecting apparatus of the invention comprises the following configurations.

(1) There are provided rotation means for rotating a rotating disk on which a pattern for alternately repeating reflection and non-reflection or transmission and non-transmission of light is formed along with a rotated member, detection means for applying light to the rotating disk rotated by the rotation means and detecting a pulse waveform by its reflected light or transmitted light, and rotational direction determination means for determining a rotational direction of the rotated member based on the pulse waveform detected by the detection means, and the rotating disk is a rotating disk on which plural sets of patterns in which pulse widths of pulses detected at the time of normal rotation increase or decrease continuously in three steps or more are formed, and the rotational direction determination means determines a rotational direction of the rotating disk from a change in pulse widths or pulse intervals of continuous pulses.

In this configuration, the rotation means rotates the: rotating disk along with the rotated member. The rotating disk is mounted in, for example, a rotating shaft of a motor directly or through a gear. The rotated member and the rotating disk are rotated in the same direction at the same rotational speed. Therefore, a rotational direction and a rotational speed of the rotated member can be detected by detecting a rotational direction and a rotational speed of the rotating disk.

Since the rotating disk is a rotating disk on which plural sets of patterns in which pulse widths (or pulse intervals) of pulses detected at the time of normal rotation increase (or decrease) continuously in three steps or more are formed, by detecting four continuous pulses (or pulse intervals), it can be determined whether the pulse widths (or pulse intervals) have changed in an increase direction or a decrease direction and as a result, a rotational direction can be determined. When the pulse widths (or pulse intervals) have changed in the increase direction, there is normal rotation (reverse rotation in the case that decreasing patterns are formed) and in reverse, when the pulse widths (or pulse intervals) have changed in the decrease direction, there is reverse rotation (normal rotation in the case that decreasing patterns are formed).

Since plural sets of the patterns are formed on the rotating disk, four continuous pulses (or pulse intervals) can be detected during time shorter than time for which the rotating disk rotates once. Therefore, time necessary to acquire information (pulse widths (or pulse intervals) of four pulses) necessary to determine a rotational direction can be reduced, so that a reduction in time taken to determine the rotational direction can be achieved.

Incidentally, five or more continuous pulses (or pulse intervals) may be detected in the case of determining the rotational direction, but when the number of pulses to be detected is increased, time necessary to detect the rotational direction becomes long by the increased number, so that the number of pulses to be detected is preferably set to four.

(2) The rotating disk is a rotating disk on which plural sets of patterns in which pulse widths or pulse intervals of pulses detected at the time of normal rotation increase or decrease continuously in three steps are formed, and there is provided rotational speed calculation means for calculating a rotational speed of the rotating disk from the minimum pulse width or pulse interval detected.

In this configuration, all the pulses obtained with respect to one set of the pattern formed on the rotating disk can be detected. Here, sizes of the pattern in which the pulse width or pulse interval becomes minimum, the pattern in which it becomes the maximum and further the pattern in which it becomes a middle size are known. Therefore, a rotational speed of the rotating disk can be calculated from the pulse width or pulse interval of any pulse and a size of the pattern in which its pulse width or pulse interval is obtained.

(3) The pattern formed on the rotating disk is a pattern in which the pulse widths or the pulse intervals become constant at the time of rotation at constant speed and there is provided rotational speed calculation means for calculating a rotational speed of the rotating disk from said pattern.

In this configuration, the pulse widths or the pulse intervals obtained at the time of rotating the rotating disk at constant speed are constant. That is, a size of non-reflection (or pattern of non-transmission) formed on the rotating disk is the same. This size is known, so that a rotational speed of the rotating disk can be calculated by detecting the pulse widths or the pulse intervals.

(4) There are provided rotation means for rotating a rotating disk on which a pattern for alternately repeating reflection and non-reflection or transmission and non-transmission of light is formed along with a rotated member, detection means for applying light to the rotating disk rotated by the rotation means and detecting a pulse waveform by its reflected light or transmitted light, and rotational direction determination means for determining a rotational direction of the rotated member based on the pulse waveform detected by the detection means and the rotating disk is a rotating disk on which plural sets of patterns in which rise intervals or fall intervals of continuous pulses detected at the time of normal rotation increase or decrease continuously in three steps or more are formed, and the rotational direction determination means determines a rotational direction of the rotating disk from a change in the rise intervals or the fall intervals of continuous pulses.

In this configuration, the rotation means rotates the rotating disk along with the rotated member in a manner similar to (1) described above. The rotating disk is mounted in, for example, a rotating shaft of a motor directly or through a gear. The rotated member and the rotating disk are rotated in the same direction at the same rotational speed. Therefore, a rotational direction and a rotational speed of the rotated member can be detected by detecting a rotational direction and a rotational speed of the rotating disk.

Since the rotating disk is a rotating disk on which plural sets of patterns in which rise intervals or fall intervals of continuous pulses detected at the time of normal rotation increase (or decrease) continuously in three steps or more are formed, four rise intervals or fall intervals of continuous pulses can be obtained by detecting rises or falls of five continuous pulses. It can be determined whether the rise intervals or fall intervals have changed in an increase direction or a decrease direction from the four rise intervals or fall intervals and as a result, a rotational direction can be determined.

Here, the rises or falls of five continuous pulses can be detected during time shorter than time for which the rotating disk rotates once in a manner similar to (1) described above. Therefore, a reduction in time necessary to detect the rotational direction can be achieved.

Also, since it is unnecessary to detect the falls or rises of pulses, processing necessary to determine the rotational direction is reduced by the amount, and a further reduction in time necessary to determine the rotational direction can be achieved. Further, a configuration of an apparatus body can be simplified, so that cost cutting of the apparatus body can be achieved.

Incidentally, rises or falls of six or more continuous pulses may be detected in the case of determining the rotational direction, but when the number of detections is increased, time necessary for this detection becomes long, so that it is preferable to detect rises or falls of five continuous pulses and determine the rotational direction.

(5) The rotating disk is a rotating disk on which plural sets of patterns in which rise intervals or fall intervals of continuous pulses detected at the time of normal rotation increase or decrease continuously in three steps are formed, and there is provided rotational speed calculation means for calculating a rotational speed of the rotating disk from the minimum rise interval or fall interval detected.

In this configuration, all the rise intervals or fall intervals obtained with respect to one set of the pattern formed on the rotating disk can be detected. Here, sizes of the pattern in which the rise interval or fall interval becomes minimum, the pattern in which it becomes maximum and further the pattern in which it becomes a middle size are known. Therefore, a rotational speed of the rotating disk can be calculated from any rise interval or fall interval and a size of the pattern in which its rise interval or fall interval is obtained.

DETAILED DESCRIPTION OF THE PREFERRED EMBODIMENTS

Now, a description will be given in more detail of preferred embodiments of the invention with reference to the accompanying drawings.

Figure 1:
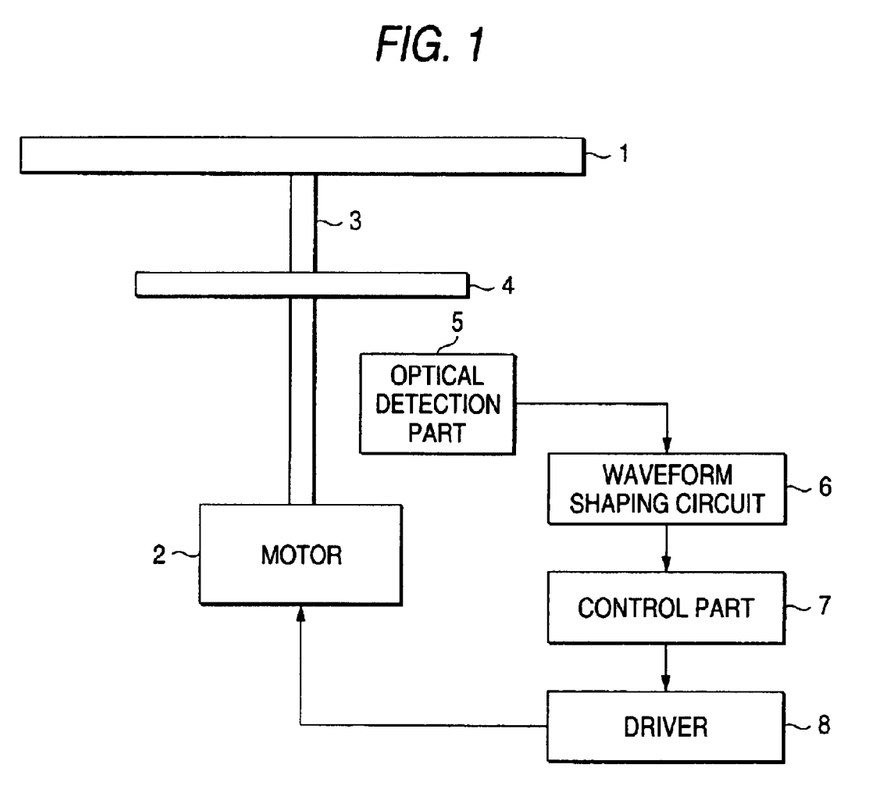
FIG. 1 is a diagram showing a configuration of a rotational direction detecting apparatus which is an embodiment of this invention.

FIG. 1 is a diagram showing a configuration of a rotational direction detecting apparatus which is an embodiment of the invention. The rotational direction detecting apparatus of this embodiment is an apparatus for detecting a rotational direction and a rotational speed of a disk medium in a mechanism part (hereinafter called "a rotating mechanism part") for rotating the disk medium such as a CD or a DVD.

In FIG. 1, numeral 1 is a turntable on which the disk medium such as a CD or a DVD is placed. The turntable 1 is mounted in a rotating shaft 3 of a motor 2. Also, a rotating disk 4 on which a pattern for alternately repeating reflection and non-reflection of light is formed is mounted in the rotating shaft 3. This turntable 1 and the rotating disk 4 are rotated by the motor 2. The turntable 1 and the rotating disk 4 rotate at the same speed in the same direction. Also, the disk medium placed on the turntable 1 rotates along with the turntable 1, so that the disk medium rotates at the same speed in the same direction as that of the rotating disk 4. Details of the pattern formed on the rotating disk 4 will be described below.

Also, numeral 5 shown in FIG. 1 is an optical detection part for applying light to the rotating disk 4 and detecting and outputting a pulse waveform by its reflected light. Numeral 6 is a waveform shaping circuit for shaping an output waveform of the optical detection part 5, and a waveform shaped by the waveform shaping circuit 6 is inputted to a control part 7.

Incidentally, in this embodiment, the pattern for repeating reflection and non-reflection of light is formed on the rotating disk 4, but a pattern for repeating transmission and non-transmission of light may be formed on the rotating disk 4. In this case, the optical detection part 5 may be placed so that a light emitting part and a light receiving part are opposed with the rotating disk 4 sandwiched between them.

The control part 7 is a microcomputer of one chip equipped with a CPU, ROM and RAM, and calculates a rotational speed while determining a rotational direction of the turntable 1 (actually the rotating disk 4) based on input from the waveform shaping circuit 6. Also, the control part 7 gives a control signal for instructing the rotational direction and the rotational speed of the motor 2 to a driver 8. The driver 8 controls an operation of the motor 2 according to this control signal.

Incidentally, in the rotating disk 4, the pattern is formed on the lower side in FIG. 1. Also, in this embodiment, a rotational direction of the turntable 1 is the same as a rotational direction of the motor 2 and a rotational speed is the same as a rotational speed of the motor 2.

Also, with respect to the pattern formed on the rotating disk 4 in the following description, when a reflection region of light is replaced with a transmission region of light and a non-reflection region of light is replaced with a non-transmission region of light, the rotating disk 4 on which a pattern for repeating transmission and non-transmission of light having the similar effect is formed can be obtained.

Figure 2:
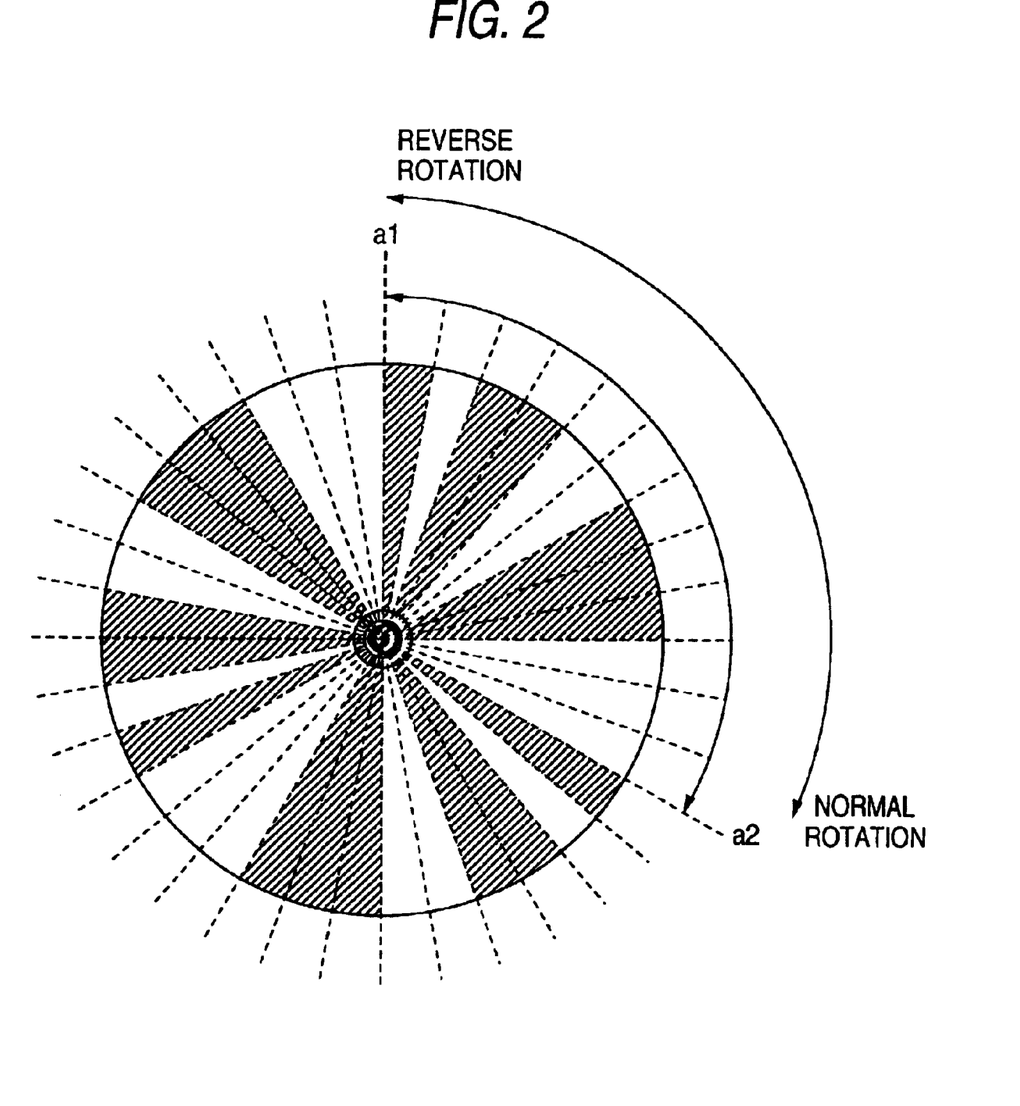
FIG. 2 is a diagram showing a pattern formed on a rotating disk of the rotational direction detecting apparatus which is the embodiment of the invention.

Next, the pattern for alternately repeating reflection and non-reflection of light formed on the lower side of the rotating disk 4 will be described. FIG. 2 is a diagram showing the pattern formed on the rotating disk. In FIG. 2, regions shown by hatching are non-reflection regions and the other regions are reflection regions. The optical detection part 5 outputs a high level in the case of applying light to the reflection regions (in the case of being opposed to the reflection regions), and outputs a low level in the case of applying light to the non-reflection regions (in the case of being opposed to the non-reflection regions).

Three sets of patterns in which the non-reflection regions and the reflection regions are alternately indicated in the proportion of 1:1:2:2:3:3 are formed on the rotating disk 4 shown in FIG. 2. One set of the pattern is formed in the range of a1 to a2 shown in the drawing. Three sets of the patterns are formed on the whole rotating disk 4.

Figure 3A:
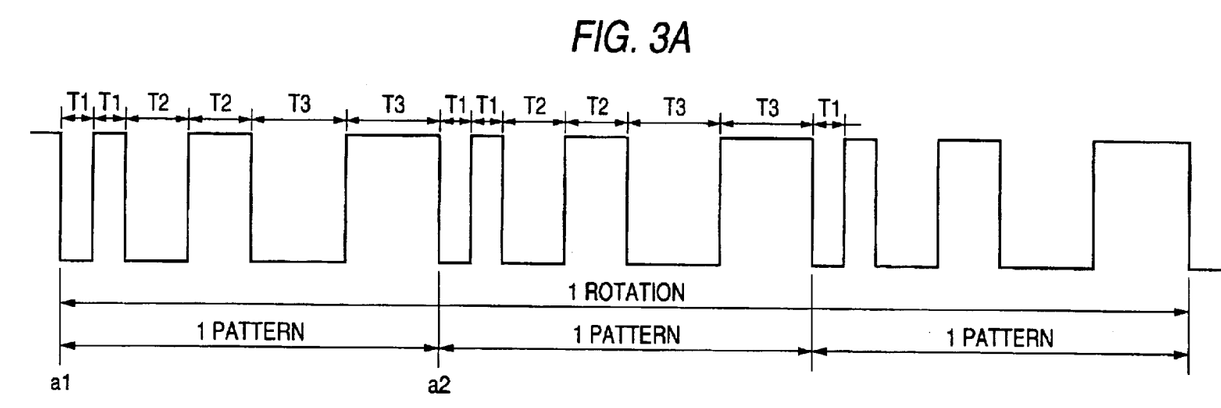
FIGS. 3A and 3B are diagrams showing a pulse waveform obtained from the pattern formed on the rotating disk of the rotational direction detecting apparatus which is the embodiment of the invention.
Figure 3B:
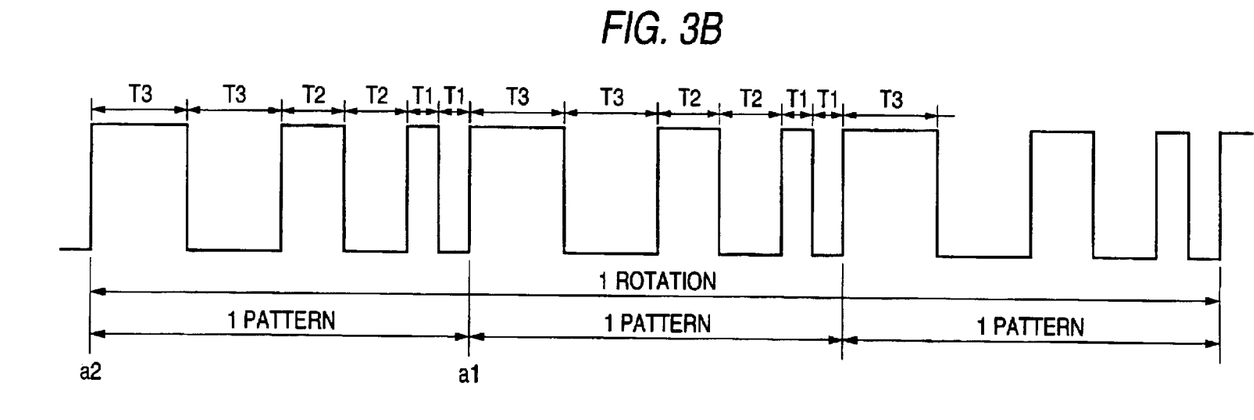

When the rotating disk 4 rotates clockwise (hereinafter called "normal rotation"), a pulse waveform shown in FIG. 3A is detected in the optical detection part 5. A rotational speed of the rotating disk 4 is constant. T2 shown in FIG. 3A is two times T1, and T3 is three times T1. When the rotating disk 4 rotates counterclockwise (hereinafter called "reverse rotation"), a pulse waveform shown in FIG. 3B is detected in the optical detection part 5. A rotational speed of the rotating disk 4 is constant. In FIG. 3B, T2 is two times T1, and T3 is three times T1.

As is evident from FIGS. 3A and 3B, when the rotating disk 4 is normal rotation, the optical detection part 5 repeatedly detects pulses whose pulse widths are T1, T2 (2×T1) and T3 (3×T1) in this order. In reverse, when the rotating disk 4 is reverse rotation, it repeatedly detects pulses whose pulse widths are T3 (3×T1), T2 (2×T1) and T1 in this order. Since three sets of the patterns are formed on the rotating disk 4, a waveform in the range of a1 to a2 shown in FIGS. 3A and 3B is repeatedly detected three times during one rotation.

Figure 4:
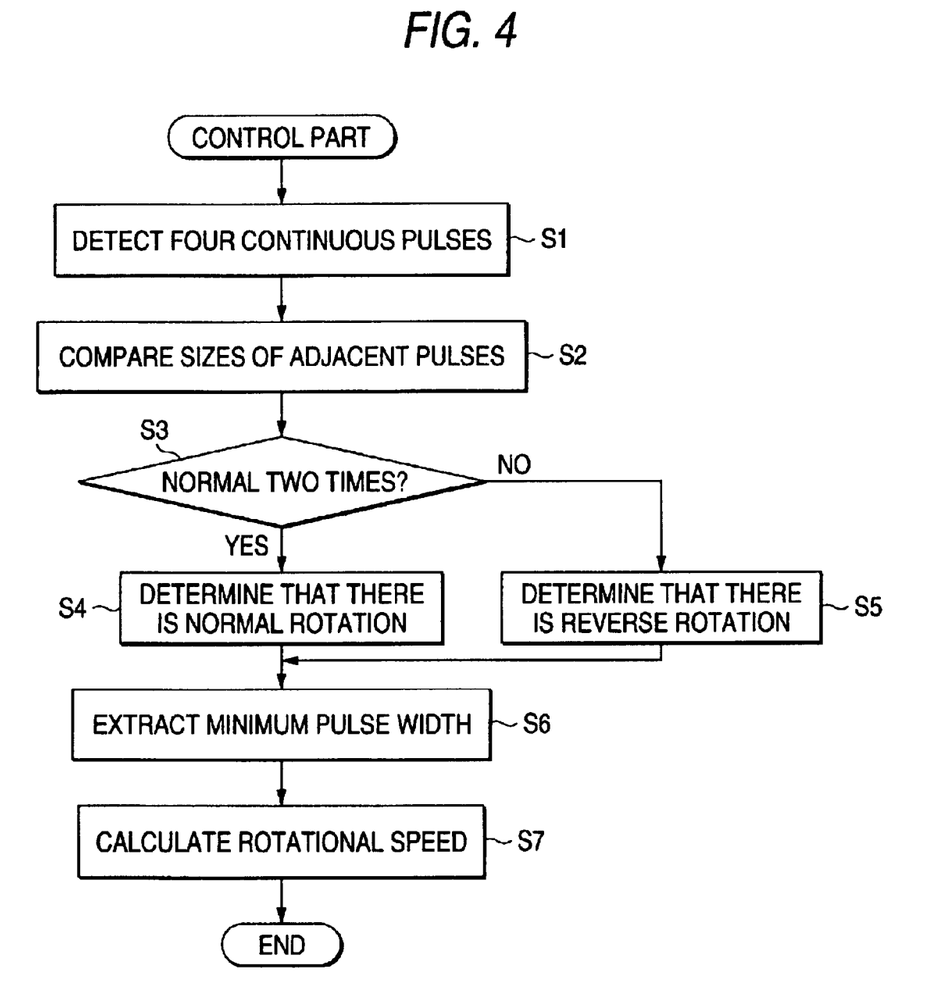
FIG. 4 is a flowchart showing an operation of the rotational direction detecting apparatus which is the embodiment of the invention.

Next, detection processing of a rotational direction and a rotational speed in the control part 7 will be described. FIG. 4 is a flowchart showing processing for detecting a rotational direction and a rotational speed in the control part which is the embodiment of the invention.

The control part 7 detects the pulse widths with respect to four continuous pulses (s1). A signal shaped by the waveform shaping circuit 6 is inputted to the control part 7. Here, the reason why the number of pulses for detecting the pulse widths is set to four will be described.

In the case that the number of pulses for detecting the pulse widths is three, the pulse widths are stored in order of detecting the pulses, and ① a size of a pulse width w1 of a pulse detected first is compared with a size of a pulse width w2 of a pulse detected second and when w2 is larger, it is determined that there is normal, ② the size of the pulse width w2 of the pulse detected second is compared with a size of a pulse width w3 of a pulse detected third and when w3 is larger, it is determined that there is normal, ③ the size of the pulse width w3 of the pulse detected third is compared with the size of the pulse width w1 of the pulse detected first and when w1 is larger, it is determined that there is normal, and ④ in the determinations of ① to ②, when the number of cases determined that there is normal is two times or more, it is determined that there is normal rotation and otherwise, it is determined that there is reverse rotation.

Here, as is evident from the waveforms shown in FIGS. 3A and 3B, when the rotating disk is normal rotation, the pulse widths detected are repeats of w1, w2, w3, w1, w2, w3, . . . Here, when w1 is considered as T1 shown in FIGS. 3A and 3B, it is determined that there is normal in the determinations of ① and ②, and when it is considered as T2, it is determined that there is normal in the determinations of ① and ③, and further when it is considered as T3, it is determined that there is normal in the determinations of ② and ③.

In reverse, when it is reverse rotation, the pulse widths detected are repeats of w3, w2, w1, w3, w2, w1, . . . Here, when w1 is considered as T1 shown in FIGS. 3A and 3B, it is determined that there is normal in the determination of ①, and when it is considered as T2, it is determined that there is normal in the determination of ②, and further when it is considered as T3, it is determined that there is normal in the determination of ③.

In this manner, it is determined that there is normal two times in the determinations of ① to ③ when it is normal rotation, and it is determined that there is normal only one time in the determinations of ① to ③ when it is reverse rotation. Therefore, a rotational direction of the rotating disk 4 can be determined from the number of cases determined that there is normal.

In this embodiment, the pulse widths are detected with respect to four pulses as described above, and the pulse width w1 used in the determination of ③ is detected again. Specifically, ③ is replaced with ③' the size of the pulse width w3 of the pulse detected third is compared with a size of a pulse width w4 of a pulse detected fourth and when w4 is larger, it is determined that there is normal, and thereby this embodiment is constructed so as to detect four pulses.

When a rotational speed of the rotating disk 4 changes, the pulse width w detected changes even in the case of the same pattern. Therefore, in the case of detecting a rotational direction by the three pulses, there is a possibility that a rotational speed of the rotating disk 4 at the time of detecting the pulse width from the first pulse and a rotational speed of the rotating disk 4 at the time of detecting the pulse width from the last (third) pulse have changed greatly. On the other hand, by detecting pulse widths with respect to four pulses, a change in the rotational speed of the rotating disk 4 at the time of detecting pulses of the two pulse widths compared can be suppressed to improve determination accuracy of a rotational direction.

Processing of the determinations of ① to ③' corresponds to s2 shown in FIG. 4, and ④ corresponds to processing of s3 to s5.

Thus, the rotational direction detecting apparatus of this embodiment detects a rotational direction of the rotating disk 4 by detecting pulse widths of four continuous pulses. Here, the pulse widths of the four pulses can be detected during a period for which the rotating disk 4 does not rotate once, so that time necessary to detect the pulse widths of the four pulses can be reduced and as a result, a reduction in time necessary to determine the rotational direction can be achieved.

When the control part 7 determines the rotational direction of the rotating disk 4 in s4 or s5, it next calculates a rotational speed of the rotating disk 4. The control part 7 extracts the pulse whose pulse width is minimum (w-min) among the four continuous pulses detected in s1 (s6). The pulse extracted in s6 is a pulse corresponding to T1 shown in FIGS. 3A and 3B.

The control part 7 calculates a rotational speed of the rotating disk 4 from the following formula (s7).

$$\text{Rotational speed (rpm)} = (1/(36 \times T1)) \times 60$$

Incidentally, here, it is constructed so that the rotational speed is calculated using the minimum pulse width, but it may be constructed so that the rotational speed is calculated using other pulse widths such as the maximum pulse width. For example, when the rotational speed is detected using the maximum pulse width (w-max), it becomes $$\text{Rotational speed (rpm)} = (3/(36 \times T3)) \times 60$$
$$= (1/(36 \times T1)) \times 60.$$

Thus, the rotational direction detecting apparatus of this embodiment can make the determination of the rotational direction of the rotating disk 4 and the calculation of the rotational speed by simple processing, so that control of the rotational direction or the rotational speed can be performed rapidly with respect to the disk medium placed on the turntable 1.

Also, in the embodiment, the determination of the rotational direction and the calculation of the rotational speed are made by detecting the pulse width, but the determination of the rotational direction and the calculation of the rotational speed can be made by the processing described above even in the case of detecting a pulse interval rather than the pulse width.

Also, in the embodiment, there was a pattern in which the pulse widths and the pulse intervals increase continuously in three steps, but there may be a pattern in which the pulse widths and the pulse intervals decrease continuously in three steps. In this case, the determination of the rotational direction is only reversed.

Figure 5:
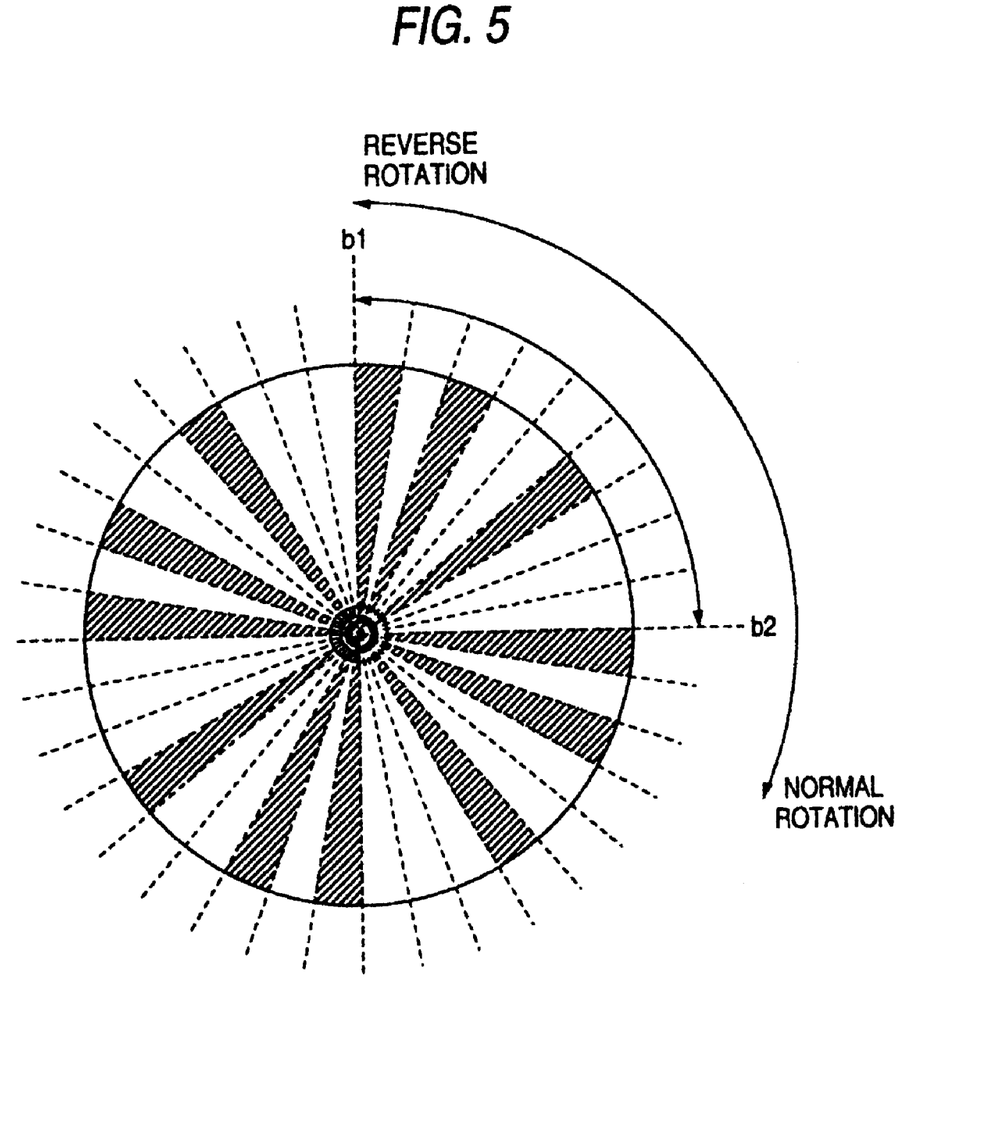
FIG. 5 is a diagram showing a pattern formed on a rotating disk of a rotational direction detecting apparatus which is another embodiment of the invention.

Next, another pattern formed on the rotating disk 4 will be described. FIG. 5 is a diagram showing this pattern. Also in FIG. 5, regions shown by hatching are non-reflection regions and the other regions are reflection regions. The optical detection part 5 outputs a high level in the case that the reflection regions are opposed, and outputs a low level in the case that the non-reflection regions are opposed.

Four sets of patterns in which the non-reflection regions and the reflection regions are alternately indicated in the proportion of 1:1:1:2:1:3 are formed on the rotating disk 4 shown in FIG. 5. One set of the pattern is formed in the range of b1 to b2 shown in the drawing. Four sets of the patterns are formed on the whole rotating disk 4.

Figure 6A:
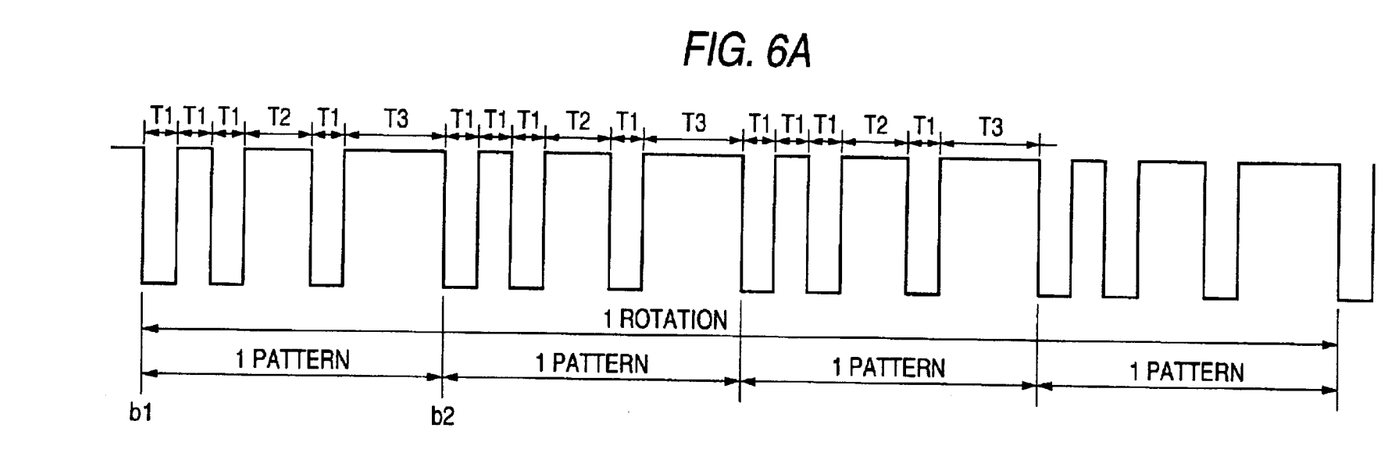
FIGS. 6A and 6B are diagrams showing a pulse waveform obtained from the pattern formed on the rotating disk of the rotational direction detecting apparatus which is another embodiment of the invention.
Figure 6B:
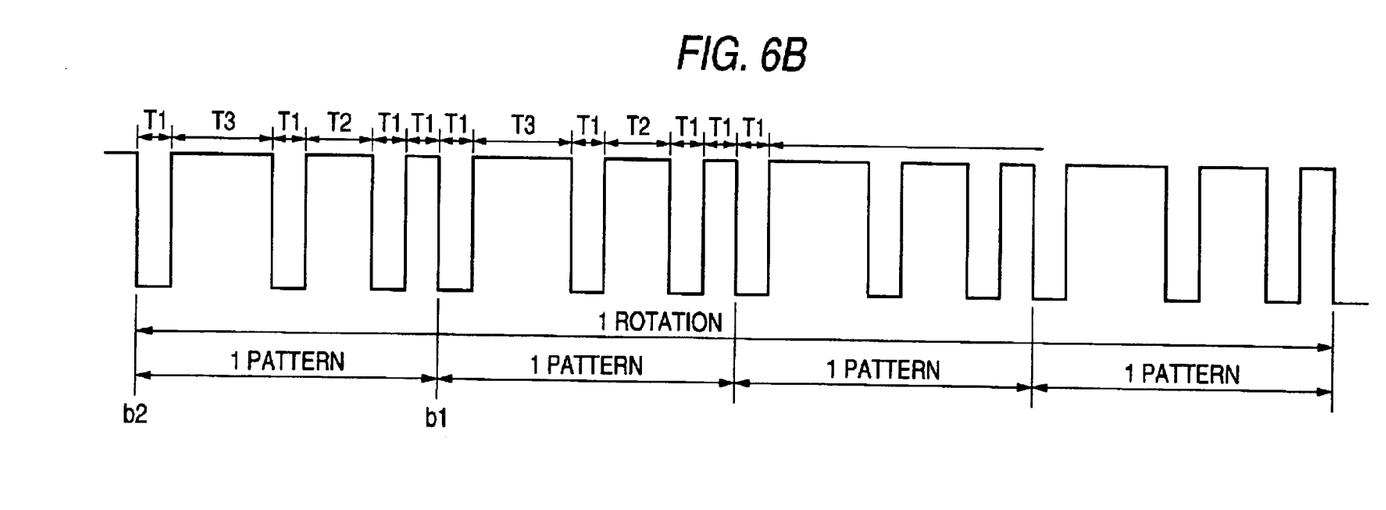

When the rotating disk 4 rotates clockwise (hereinafter called "normal rotation"), a pulse waveform shown in FIG. 6A is detected in the optical detection part 5. A rotational speed of the rotating disk 4 is constant. T2 shown in FIG. 6A is two times T1, and T3 is three times T1. When the rotating disk 4 rotates counterclockwise (hereinafter called "reverse rotation"), a pulse waveform shown in FIG. 6B is detected in the optical detection part 5. A rotational speed of the rotating disk 4 is constant. In FIG. 6B, T2 is two times T1, and T3 is three times T1.

Further, a width at a low level is always T1 irrespective of a rotational direction of the rotating disk 4.

As is evident from FIGS. 6A and 6B, when the patterns shown in FIG. 5 are formed on the rotating disk 4, in the case of normal rotation, pulses whose pulse widths are T1, T2 (2×T1) and T3 (3×T1) are repeatedly detected in this order. In reverse, when the rotating disk 4 is reverse rotation, pulses whose pulse widths are T3 (3×T1), T2 (2×T1) and T1 are repeatedly detected in this order. Since three sets of the patterns are formed on the rotating disk 4, a waveform in the range of b1 to b2 shown in FIG. 5 is repeatedly detected four times during one rotation.

Figure 7:
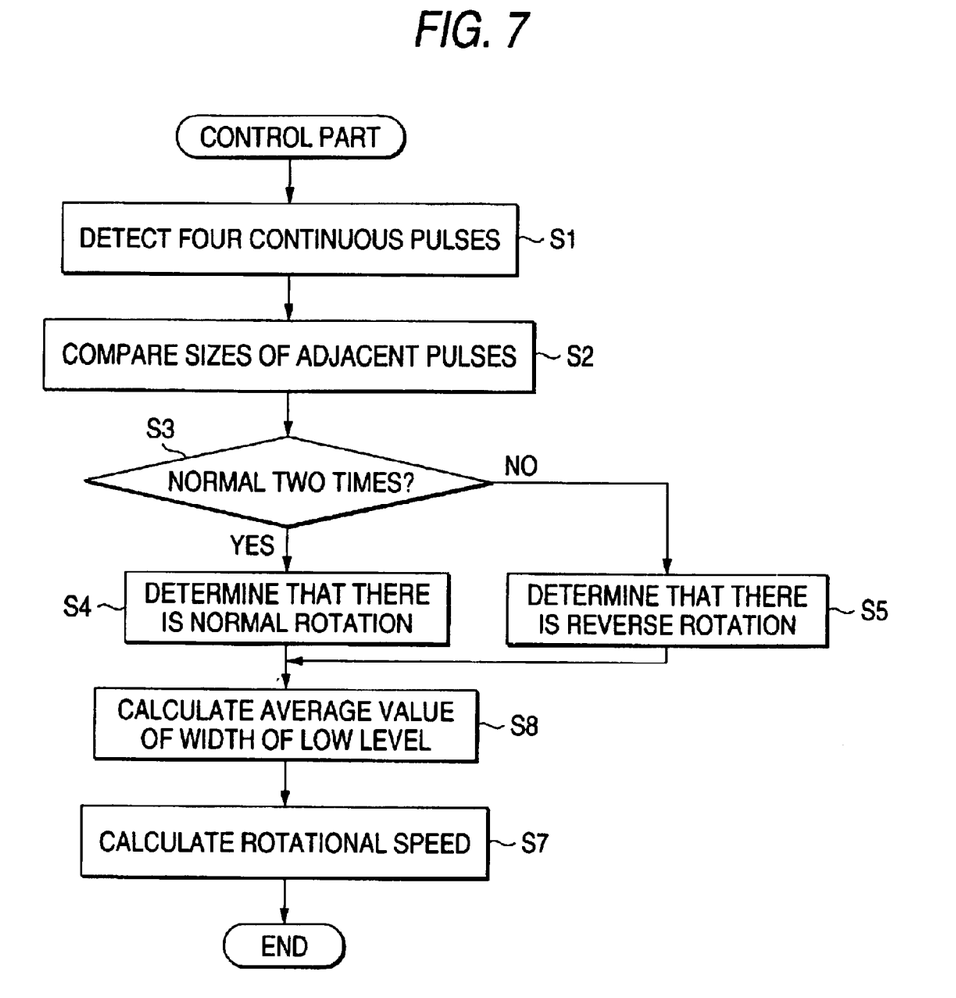
FIG. 7 is a flowchart showing an operation of the rotational direction detecting apparatus which is another embodiment of the invention.

Next, determination processing of a rotational direction and calculation processing of a rotational speed by the rotating disk on which the patterns shown in FIG. 5 are formed will be described. FIG. 7 is a flowchart showing this processing. The same step numbers (s*) are attached to the same processing as the processing described in FIG. 4.

The control part 7 performs the processing of s1 to s5 and determines a rotational direction.

When the control part 7 detects the rotational direction, it calculates an average value of time taken from a fall of each the pulse whose pulse width is detected in s1 to a rise of the next pulse (s8). In s8, an average value of time (three places) for which there has been a low level among four pulses whose pulse widths are detected is calculated. In the patterns shown in FIG. 5, all the non-reflection regions have the same size. The control part 7 calculates a rotational speed from the following formula using the average value calculated in s8 (s7)

Thus, detection accuracy of the time T1 can be improved by using the average time for which there has been a low level.

Also, in this embodiment, four sets of the patterns more than those of the embodiment described above are formed on the rotating disk 4, so that time necessary for processing of detecting the pulse widths with respect to the four pulses in s1 is reduced more. Therefore, time necessary for determination of the rotational direction and calculation of the rotational speed can be reduced more.

Figure 8A:
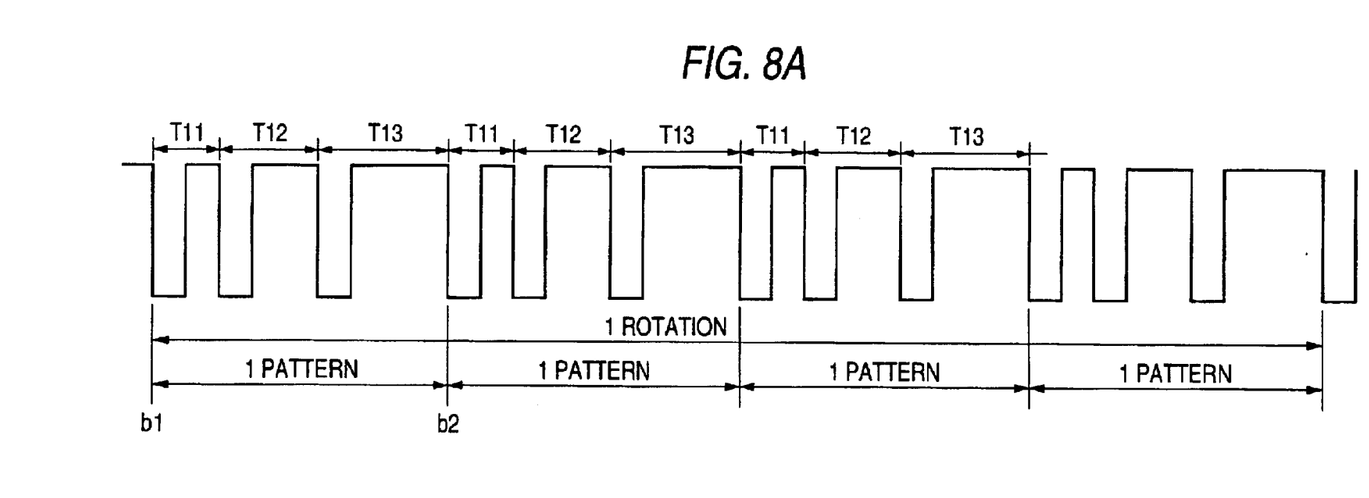
FIGS. 8A and 8B are diagrams showing a pulse waveform obtained from a pattern formed on a rotating disk of a rotational direction detecting apparatus which is a further embodiment of the invention.
Figure 8B:
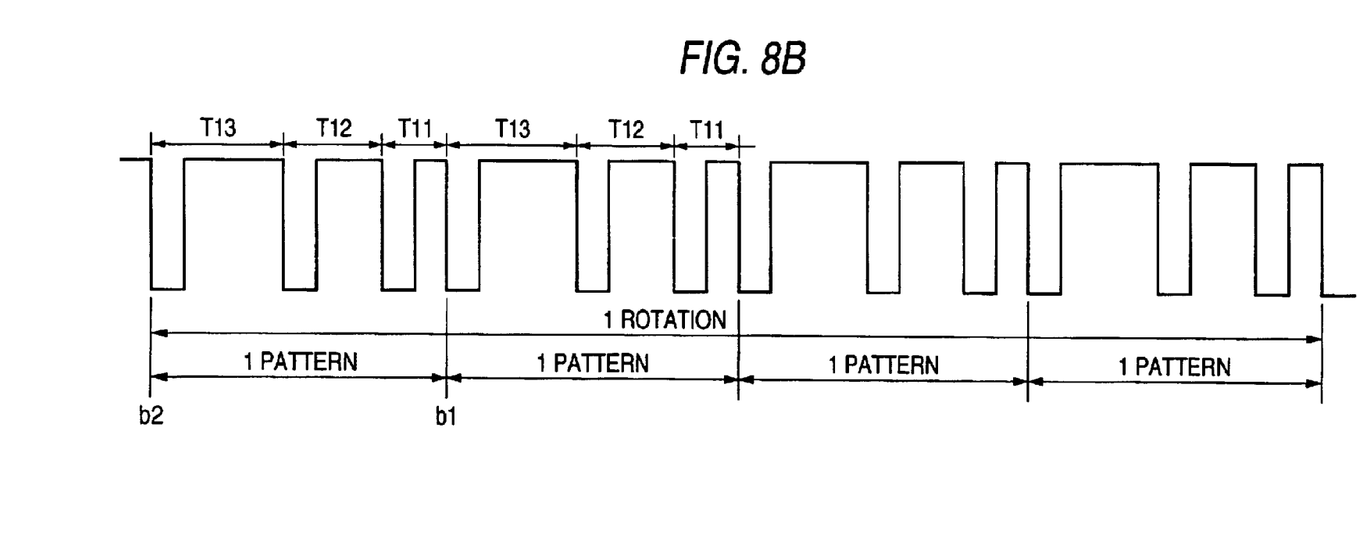

Further, in the rotating disk 4 on which the patterns shown in FIG. 5 are formed, as shown in FIGS. 8A and 8B, fall intervals of pulses are repeats of 2:3:4 (=T11:T12:T13) at the time of normal rotation, and are repeats of 4:3:2 (=T13:T12:T11) at the time of reverse rotation. Thus, the fall intervals increase continuously in three steps at the time of normal rotation, and decrease continuously in three steps at the time of reverse rotation.

Therefore, by detecting four continuous fall intervals from five continuous pulses and performing processing of the following ① to ④, the rotational direction of the rotating disk 4 can be detected.

① A size of a fall interval Ta detected first is compared with a size of a fall interval Tb detected second and when Tb is larger, it is determined that there is normal, and
② the size of the fall interval Tb detected second is compared with a size of a fall interval Tc detected third and when Tc is larger, it is determined that there is normal, and
③ the size of the fall interval Tc detected third is compared with a size of a fall interval Td detected fourth and when Td is larger, it is determined that there is normal, and
④ in the determinations of ① to ③, when the number of cases determined that there is normal is two times or more, it is determined that there is normal rotation and otherwise, it is determined that there is reverse rotation.

Figure 9:
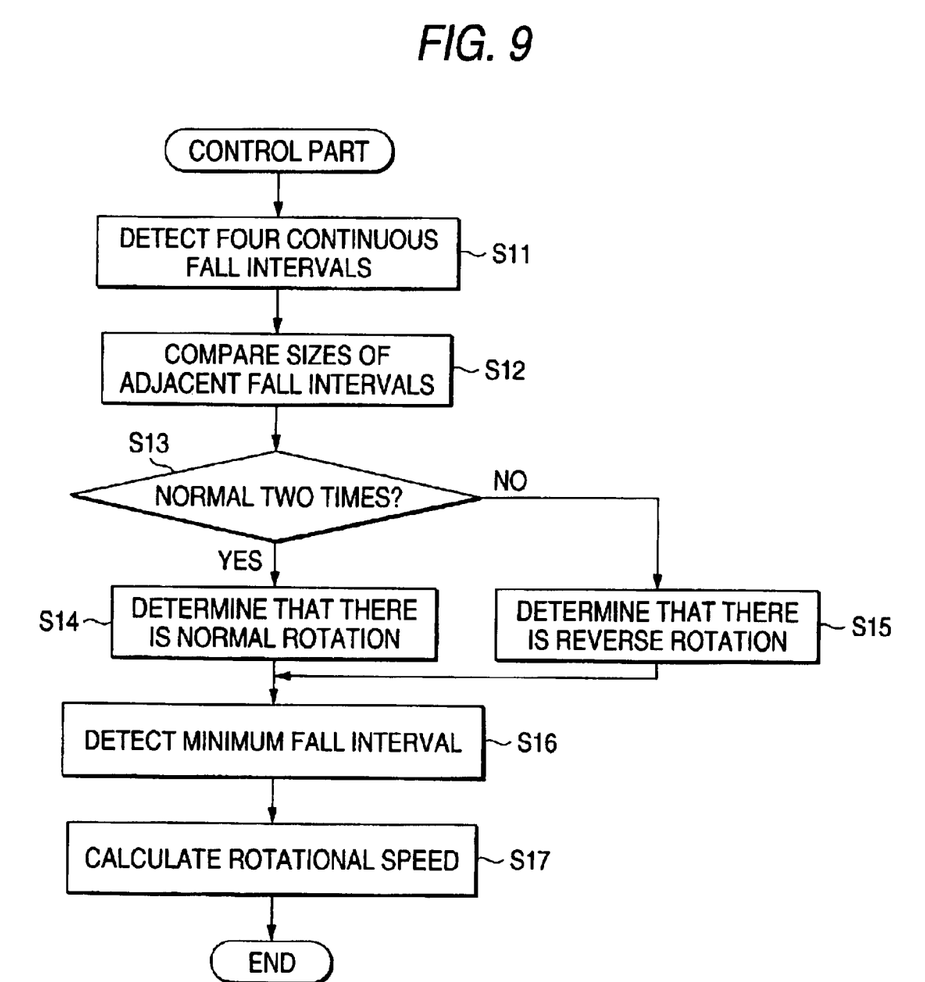
FIG. 9 is a flowchart showing an operation of the rotational direction detecting apparatus which is the further embodiment of the invention.

Here, FIG. 9 is a flowchart showing the processing described above. The control part 7 detects four continuous fall intervals (s11) and performs the processing of ① to ③ in s12 and performs the processing of ④ in s13 to s15.

Thus, the rotational direction detecting apparatus of this embodiment detects a rotational direction of the rotating disk 4 by detecting four continuous fall intervals from five continuous pulses. Here, the four continuous fall intervals can be detected during a period for which the rotating disk 4 does not rotate once, so that a reduction in time necessary to determine the rotational direction can be achieved.

When the control part 7 determines the rotational direction of the rotating disk 4 in s14 or s15, it next calculates a rotational speed of the rotating disk 4. The control part 7 extracts the minimum fall interval among the four continuous fall intervals detected in s1 (s16). The fall interval extracted in s16 is a fall interval corresponding to T11 shown in FIGS. 8A and 8B.

The control part 7 calculates a rotational speed of the rotating disk 4 from the following formula (s17).

Rotational speed (rpm)=(2/(36×T11))×60

Incidentally, here, it is constructed so that the rotational speed is calculated using the minimum fall interval, but it may be constructed so that the rotational speed is calculated using other fall intervals such as the maximum fall interval. For example, when the rotational speed is detected using the maximum fall interval, it becomes $$\text{Rotational speed (rpm)} = (4/(36 \times T13)) \times 60$$
$$= (2/(36 \times T11)) \times 60.$$

Thus, the rotational direction detecting apparatus of this embodiment can detect the rotational direction of the rotating disk 4 by detecting four continuous fall intervals of pulses.

Also, since it is unnecessary to detect a rise of a pulse and it is necessary to detect only a fall in the processing shown in FIG. 9, information (fall interval) used in determination of the rotational direction or calculation of the rotational speed can be detected easily, so that a configuration of a body is simplified and cost cutting of the apparatus body can be achieved.

Incidentally, in the embodiment, it is constructed so that the rotational direction is determined based on the four continuous fall intervals detected, but it may be constructed so that four continuous rise intervals are detected and based on the rise intervals detected herein, determination of the rotational direction and calculation of the rotational speed are made. As is evident from FIGS. 8A and 8B, in the rotating disk 4 on which the patterns shown in FIG. 5 are formed, rise intervals of pulses are repeats of 2:3:4 (=T11:T12:T13) at the time of normal rotation, and are repeats of 4:3:2 (=T13:T12:T11) at the time of reverse rotation. (This is similar to the case of the fall intervals described above.) Incidentally, the invention can be applied to all the things for performing rotary motion as well as the rotating mechanism part for rotating the disk medium.

Also, in the embodiment, the case that the pulse widths or the fall intervals increase continuously in three steps in the patterns formed on the rotating disk 4 has been taken as an example, but there may be patterns in which they decrease continuously in three steps, or there may be patterns in which they change in four steps or five steps.

As described above, according to the invention, time necessary to detect information used in determination of a rotational direction or detection of a rotational speed can be reduced and a processing speed can be improved.

Also, by using fall intervals or rise intervals as information used in determination of the rotational direction or calculation of the rotational speed, a configuration of an apparatus body can be simplified and cost cutting of the apparatus body can be achieved.

What is claimed is:

1. A rotational direction detecting apparatus comprising:
   a rotation means for rotating disk on which regions for reflection and non-reflection or transmission and non-transmission of light are alternatively formed along with a rotated member;
   a detection means for applying light onto the rotating disk rotated by the rotation means and for detecting a pulse waveform by its reflected light or transmitted light with plural sets of patterns in which pulse widths or pulse intervals of pulses detected by the detection means at the time of normal rotation increase or decrease repeatedly in three steps being formed on the rotating disk, a rotational direction determination means for determining a rotational direction of the rotated member based on the pulse waveform detected by the detection means, wherein the rotational direction determination means detects four consecutive pulses and determines a rotational direction of the rotating disk from a change in these pulse widths; and a rotational speed calculation means for calculating a rotational speed of the rotating disk from said pattern.

2. A rotational direction detecting apparatus comprising:

a rotation means for rotating a rotating disk on which regions for reflection and non-reflection or transmission and non-transmission of light are alternatively formed along with a rotated member;

a detection means for applying light onto the rotating disk rotated by the rotation means and for detecting a pulse waveform by its reflected light or transmitted light with plural sets of patterns in which rise intervals or fall intervals of consecutive pulses detected by the detection means at the time of normal rotation increase or decrease repeatedly in three steps being formed on the rotating disk;

a rotational direction determination means for determining a rotational direction of the rotated member based on the pulse waveform detected by the detection means, the rotational direction determination means detecting a change in four consecutive rise intervals or fall intervals from five consecutive pulses and determining a rotational direction of the rotating disk from the change in the rise intervals or the fall intervals detected herein; and a rotational speed calculation means for calculating a rotational speed of the rotating disk from the minimum rise interval or fall interval detected.

3. A rotational direction detecting apparatus comprising:

a rotation means for rotating a rotating disk on which regions for reflection and non-reflection or transmission and non-transmission of light are alternatively formed along with a rotated member;

a detection means for applying light onto the rotating disk rotated by the rotation means and for detecting a pulse waveform by its reflected light or transmitted light with plural sets of patterns in which pulse widths of pulses detected by the detection means at the time of normal rotation increase or decrease repeatedly in three steps being formed on the rotating disk; and a rotational direction determination means for determining a rotational direction of the rotated member based on the pulse waveform detected by the detection means, the rotational direction determination means determining a rotational direction of the rotating disk from a change in pulse widths or pulse intervals of consecutive pulses.

4. The rotational direction detecting apparatus as defined in claim 3, further comprises a rotational speed calculation means for calculating a rotational speed of the rotating disk from said pattern.

5. A rotational direction detecting apparatus comprising:

a rotation means for rotating a rotating disk on which regions for reflection and non-reflection or transmission and non-transmission of light are alternatively formed along with a rotated member;

a detection means for applying light onto the rotating disk rotated by the rotation means and for detecting a pulse waveform by its reflected light or transmitted light with plural sets of patterns in which pulse widths of pulses detected by the detection means at the time of normal rotation increase or decrease repeatedly in three steps or more being formed on the rotating disk; and a rotational direction determination means for determining a rotational direction of the rotated member based on the pulse waveform detected by the detection means, the rotational direction determination means determining a rotational direction of the rotating disk from a change in pulse widths or pulse intervals of consecutive pulses, wherein the rotational direction determination means detects four consecutive pulses and determines a rotational direction of the rotating disk from a change in these pulses widths or pulse intervals.

6. The rotational direction detecting apparatus as defined in claim 5, wherein plural sets of patterns in which pulse widths or pulse intervals of pulses detected at the time of normal rotation increase or decrease repeatedly in three steps are formed on the rotating disk, and wherein said apparatus further comprises rotational speed calculation means for calculating a rotational speed of the rotating disk from the minimum pulse width or pulse interval detected.

7. A rotational direction detecting apparatus comprising:

a rotation means for rotating a rotating disk on which regions for reflection and non-reflection or transmission and non-transmission of light are alternatively formed along with a rotated member;

a detection means for applying light onto the rotating disk rotated by the rotation means and for detecting a pulse waveform by its reflected light or transmitted light with plural sets of patterns in which rise intervals or fall intervals of consecutive pulses detected by the detection means at the time of normal rotation increase or decrease repeatedly in three steps being formed on the rotating disk; and a rotational direction determination means for determining a rotational direction of the rotated member based on the pulse waveform detected by the detection means, the rotational direction determination means determining a rotational direction of the rotating disk from a change in the rise intervals or the fall intervals of consecutive pulses.

8. A rotational direction detecting apparatus comprising:

a rotation means for rotating a rotating disk on which regions for reflection and non-reflection or transmission and non-transmission of light are alternatively formed along with a rotated member;

a detection means for applying light onto the rotating disk rotated by the rotation means and for detecting a pulse waveform by its reflected light or transmitted light with plural sets of patterns in which rise intervals or fall intervals of consecutive pulses detected by the detection means at the time of normal rotation increase or decrease repeatedly in three steps or more being formed on the rotating disk; and a rotational direction determination means for determining a rotational direction of the rotated member based on the pulse waveform detected by the detection means, the rotational direction determination means determining a rotational direction of the rotating disk from a change in the rise intervals or the fall intervals of consecutive pulses, wherein the rotational direction determination means detects a change in four consecutive rise intervals or fall intervals from five consecutive pulses and determines a rotational direction of the rotating disk from the change in the rise intervals or the fall intervals detected herein.

9. The rotational direction detecting apparatus as defined in claim 8, wherein plural sets of patterns in which rise intervals or fall intervals of consecutive pulses detected at the time of normal rotation increase or decrease repeatedly in three steps are formed on the rotating disk, and wherein said apparatus further comprises rotational speed calculation means for calculating a rotational speed of the rotating disk from the minimum rise interval or fall interval detected.

* * * * *